United States Patent [19]  [11] 4,099,840
van der Wal et al. [45] Jul. 11, 1978

[54] MULTILAYER REFLECTOR FOR GAS DISCHARGE LASER

[75] Inventors: Johannes van der Wal; Wilhelmus Adrianus Jacobus Gielens; Johannes Maria Marinus Pasmans, all of Eindhoven, Netherlands

[73] Assignee: U.S. Philips Corporation, New York, N.Y.

[21] Appl. No.: 726,175

[22] Filed: Sep. 24, 1976

[30] Foreign Application Priority Data

Oct. 2, 1975 [NL] Netherlands ............ 7511581

[51] Int. Cl.$^2$ ............................................. G02B 5/28
[52] U.S. Cl. ............................. 350/166; 331/94.5 G; 252/300
[58] Field of Search ............................. 350/164, 166; 252/300 R; 427/162, 166; 331/94.5 G

[56] References Cited

U.S. PATENT DOCUMENTS

| 2,904,452 | 9/1959 | Reichelt | 350/166 X |
| 3,851,973 | 12/1974 | Macek | 350/164 X |
| 3,853,386 | 12/1974 | Ritter et al. | 350/164 |
| 3,936,768 | 2/1976 | Ichinose | 331/94.5 G X |
| 4,009,453 | 2/1977 | Mahlein | 350/166 X |

OTHER PUBLICATIONS

Kryzhanovskii et al., "Thin Microcomposite Layers . . .", Soviet Journal of Optical Technology, vol. 42, No. 12, Dec. 1975, pp. 741–742.

Primary Examiner—John K. Corbin
Assistant Examiner—John D. Lee
Attorney, Agent, or Firm—Frank R. Trifari; Norman N. Spain

[57] ABSTRACT

A multilayer reflector of which the last layer most remote from the substrate and having a high refractive index is vapor-deposited from a mixture containing a metal or oxide of an element from group 4b of the periodic table and a metal oxide from the group of beryllium oxide, magnesium oxide and calcium oxide, is particularly resistant to hydrogen and ultraviolet light and is hence suitable for application in a laser which is to have a long life.

6 Claims, 1 Drawing Figure

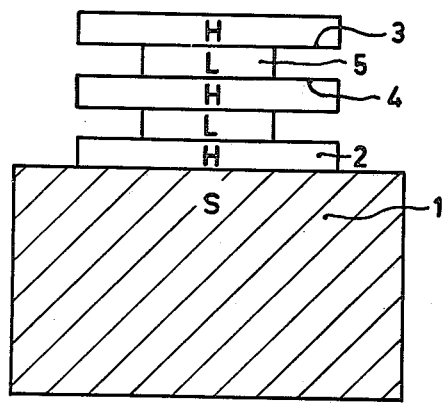

MULTILAYER REFLECTOR FOR GAS DISCHARGE LASER

The invention relates to a reflector comprising a substrate bearing a system of oxide layers alternately having high and low refractive indices, at least one of the layers being composed of a mixture of metal oxides, and to a method of manufacturing such a reflector.

Multilayer reflectors reflect light of a given wavelength range fully or partly and are used in a wide field of optics, such as for narrow band interference filters, mirrors for gas discharge lasers of high quality and condenser mirrors for projectors.

Such reflectors of the above-mentioned kind have been described in Austrian Patent Specification No. 218,193. At least one of the layers in these reflectors has been vapor deposited from a mixture of metals and/or metal oxides. Such a mixture consists for example of titanium oxide mixed with one or more elements of the group containing yttrium, lanthanum, cerium and/or one or more compounds of said elements. In such mixtures, a post-oxidation of the layers after vapor deposition is generally not necessary or only a slight post-oxidation is necessary, while vapor deposition can be carried out rapidly. Nevertheless, the result when using the said mixtures does not prove to be quite satisfactory since the layers have an unfavorable structure, i.e. are still more or less porous, so that reduction of the oxide, for example by hydrogen, is possible.

The invention provides a reflector comprising a substrate bearing a system of oxide layers alternately having high and low refractive indices, wherein at least the last layer in the system which is most remote from the substrate having a high refractive index consists of a mixture of at least one of the oxides of thorium, titanium, zirconium or hafnium and at least one of the oxides of beryllium, magnesium or calcium.

The invention is based on the recognition that at least one of the stabilizing oxides (beryllium oxide, magnesium oxide and calcium oxide) must be added. Molecules of this stabilizing oxide influence the crystal growth because they are present both interstitially, and to a greater extent, at the crystal grain boundaries. In this manner a layer is obtained which is less sensitive to, for example, reactions with the plasma of a gas discharge laser.

Such reflectors are particularly suitable for use in gas discharge lasers since they contribute to a long life (5000 hours and more) in operation.

The features and advantages of the present invention will become more apparent in light of the following detailed description as illustrated in the accompanying drawing, which is a side view of the composite layers making up the novel reflector.

The stabilizing oxide which consists of beryllium oxide, calcium oxide and magnesium oxide or a mixture thereof should constitute 1 to 30% by weight of the overall quantity of oxides used during vapor deposition. It is found that the percentages by weight of oxides in the melting crucible(s) of the vapor deposition device need not correspond to the percentages present in the layer after vapor deposition. For example, a layer vapor-deposited from a starting mixture containing 5% of calcium oxide contains 16 to 20% by weight of calcium oxide.

The maximum stabilizing effect was obtained when from 5 – 15% of the oxide mixture in the melting crucible of the vapour deposition apparatus consisted of calcium oxide.

The best mixture for vapour deposition contains approximately 95% of titanium oxide, and approximately 5% of calcium oxide.

The layers can also be deposited by sputtering in a sputtering device. However, the thickness-control of the layers is much harder by sputtering then by vapor-deposition. A first layer 2 on a glass substrate 1 generally consists of a layer having a high (H) refractive index. Subsequent layers alternately have a low (L) and a high (H) refractive index. Since the last layer usually has a high refractive index, such reflectors will usually consist of an odd number of layers. Glass or quartz substrates are frequently used. When two parallel surfaces 3 and 4 are considered and the requirement is that the light beams reflected at said surfaces must be in phase to intensity each other by interference, the optical thickness of the layer 5 must preferably be one quarter of the wavelength ($\frac{1}{4}\lambda$) in the relevant layer. The mechanical thickness is in that case $\lambda/n$ in which n is the refractive index. When very many layers are used, the successive surfaces will reflect light and each will intensity the first reflection. The maximum number of layers is determined by: 1 the absorption and scattering in the material of the layers, and 2 problems in connection with the adhesion of the layers to be substrate and to each other.

The absorption and scattering are also determined by the structure of the layer which was found to be considerably improved by using the materials and the method according to the invention.

The first step in the manufacture of such reflectors is the cleaning of the substrate so that the adhesion of the first layer to the substrate is improved and undesired scattering is prevented. The substrates are then placed in a vapour deposition apparatus in which the materials to be vapour-deposited are also present and are heated at a high temperature, the pressure in the apparatus being approximately $10^{-4}$ Torr. In this manner, layers of $\frac{1}{4}\lambda$ optical thickness ($\lambda$ is the wavelength of the laser light) are successively vapour-deposited with alternately a high and a low refractive index.

The vapour deposition can be carried out, for example, according to the following examples:

EXAMPLE 1

5 g of titanum dioxide powder was mixed with 0.25 g of calcium oxide. This mixture was compressed and transferred into a vapor deposition apparatus and was vapour deposited as the 23rd layer on a reflector after 22 layers were already deposited. The packet of layers had the following composition:

No. of layer 0 1 2 3 4 5 6 7 8 9 10 11
Material S H L H L H L H L H L H
12 13 14 15 16 17 18 19 20 21 22 23
L H L H L H L H L H L H'
briefly noted as S(HL)$^{11}$ H'.
S = glass substrate
H = titanium oxide
L = silicon oxide
H' = the 23rd layer of the above mixture of titanium dioxide and calcium oxide.

The mirror was made for a He-Ne-laser lasing at $\lambda = 632.8$ nm. Each layer was $\frac{1}{4}\lambda$-thick (optical thickness). A He-Ne-laser comprising said reflector had a constant output power of 1800 $\mu$uW for a period of 4500 hours.

EXAMPLE 2

A mixture of 95% by weight of zirconium oxide and 5% by weight of calcium oxide was compressed and was evaporated in a vapour deposition apparatus by means of an electron beam in a manner known to those skilled in the art. The last layer (i.e. the layer most remote from the glass substrate) of a titanium oxide-silicon oxide reflector was vapor-deposited using this mixture. The packet of layers had the following composition:

$S(HL)^{11} H'$

S = glass substrate
H = titanium oxide
L = silicon oxide
H' = the above mentioned last layer.

He-Ne-lasers lasing at $\lambda$ = 632.8 nm manufactured with these reflectors were operated for 2500 hours at a substantially constant output power of 1600 $\mu$uW.

EXAMPLE 3

A last layer, i.e. the layer must remote from the substrate, was vapor deposited as in example 1 but instead now using a mixture of titanium oxide and calcium oxide containing 2% by weight of calcium oxide. The resulting laser reflector had a long life and a constant quality.

EXAMPLE 4

A last layer was vapor-deposited as in example 1 but instead now using a mixture of zirconium oxide and magnesium oxide containing 2% by weight of magnesium oxide. Also in this example the resulting laser reflector had a long life and constant quality.

EXAMPLE 5

A last layer was vapor deposited as in example 1 but instead now using a mixture of metallic titanium and calcium oxide containing 2% by weight of calcium oxide. The result was also a high quality mirror.

The basic idea of the invention is the use of a combination of metal oxides in at least the last layer (i.e. the layer most remote from the substrate), said combination having a high refractive index. This combination of metal oxides can also be vapour-deposited or sputtered by those skilled in the art, from at least one of the metals thorium, titanium, hafnium and zirconium and at least one of the metal oxides beryllium oxide, magnesium oxide and calcium oxide in an oxidizing atmosphere, but vapour deposition of the oxides seems to be the best method.

What is claimed is

1. A reflector comprising a substrate bearing a system of oxide layers alternately having high and low refractive indices, wherein at least the last layer in the system which is most remote from the substrate having a high refractive index consists of a mixture of at least one of the oxides of thorium, titanium, zirconium or hafnium and at least one of the oxides of beryllium, magnesium or calcium.

2. A method of manufacturing a reflector as claimed in claim 1, characterized in that the layers are vapor deposited and during the vapor deposition of at least the last layer the quantity of oxide used of beryllium, magnesium or calcium is between 1% by weight and 30% by weight of the total mixture of oxides.

3. A method as claimed in claim 2, characterized in that at least the last layer is vapor-deposited from a mixture containing 5 to 15% by weight of calcium oxide.

4. A method as claimed in claim 3, characterized in that at least the last layer having a high refractive index is vapor-deposited from a mixture containing approximately 5% by weight of calcium oxide and approximately 95% by weight of titanium oxide.

5. A method of manufacturing a reflector as claimed in claim 1, characterized in that the layers are vapor-deposited from at least one of the metals thorium, titanium, hafnium and zirconium and at least one of the metal oxides beryllium oxide, magnesium oxide and calcium oxide in an oxidizing atmosphere.

6. A method of manufacturing a reflector as claimed in claim 1, characterized in that the layers are sputtered from at least one of the metals thorium, titanium, hafnium and zirconium and at least one of the metal oxides beryllium oxide, magnesium oxide and calcium oxide in an oxidizing atmosphere.

* * * * *